(12) United States Patent
Morris et al.

(10) Patent No.: US 8,480,183 B2
(45) Date of Patent: Jul. 9, 2013

(54) PARKING BRAKE INTERLOCK

(75) Inventors: John Michael Morris, Auburn, WA (US); Gabe Fasolino, Tigard, OR (US)

(73) Assignee: Norgren GT Development Corporation, Auburn, WA (US)

(*) Notice: Subject to any disclaimer, the term of this patent is extended or adjusted under 35 U.S.C. 154(b) by 1185 days.

(21) Appl. No.: 11/685,584

(22) Filed: Mar. 13, 2007

(65) Prior Publication Data
US 2008/0224532 A1 Sep. 18, 2008

(51) Int. Cl.
B60T 8/34 (2006.01)

(52) U.S. Cl.
USPC .................................... 303/118.1

(58) Field of Classification Search
USPC .............. 303/7, 69, 9.76, 71, 89, 118.1
See application file for complete search history.

(56) References Cited

U.S. PATENT DOCUMENTS

| | | | |
|---|---|---|---|
| 3,892,444 A | 7/1975 | Durling | |
| 4,018,485 A | 4/1977 | Fannin | |
| 4,058,349 A * | 11/1977 | Ury | 303/69 |
| 4,182,535 A * | 1/1980 | Fannin | 303/9 |
| 4,191,428 A | 3/1980 | Durling | |
| 4,635,767 A | 1/1987 | Crane | |
| 5,549,363 A | 8/1996 | Kanjo et al. | |
| 6,286,912 B1 | 9/2001 | Sturgess | |
| 6,290,309 B1 | 9/2001 | Korn | |
| 6,322,161 B1 | 11/2001 | Maslonka et al. | |
| 6,450,587 B1 | 9/2002 | MacGregor et al. | |
| 6,663,195 B1 * | 12/2003 | Arnold | 303/122.03 |
| 6,997,522 B2 * | 2/2006 | Kemer | 303/7 |
| 2002/0167219 A1 * | 11/2002 | Kemer et al. | 303/7 |
| 2006/0076823 A1 * | 4/2006 | Soupal | 303/7 |
| 2006/0232125 A1 * | 10/2006 | Thomas | 303/7 |

* cited by examiner

Primary Examiner — Bradley King
Assistant Examiner — Vishal Sahni
(74) Attorney, Agent, or Firm — The Ollila Law Group LLC

(57) ABSTRACT

A parking brake interlock is provided according to the invention. The parking brake interlock includes a parking brake inlet configured to receive a parking brake air supply, a service brake inlet configured to receive a service brake air supply, an exhaust port, and an interlock valve mechanism in communication with the parking brake inlet, the service brake inlet, and the exhaust port. The interlock valve mechanism is configured to exhaust the parking brake air supply if the service brake air pressure is not received. The interlock valve mechanism is further configured to hold the parking brake air supply in order to generate a parking brake air pressure if the service brake air pressure is received.

18 Claims, 8 Drawing Sheets

PARKING BRAKE INTERLOCK

BACKGROUND OF THE INVENTION

1. Field of the Invention

The present invention relates to a parking brake interlock.

2. Statement of the Problem

Many vehicles include pneumatic systems, including air brake systems. Air brake systems are often used for large, heavy vehicles. Advantageously, an air brake system offers advantages such as suitability for large vehicles, chaining between multiple units (such as truck trailers and rail cars, for example), reliability and simplicity, and safety due to automatic brake deployment in the event that air pressure is lost.

Most heavy vehicles possess a parking brake. The parking brake can be deployed when the vehicle is not moving and prevents the vehicle from moving. The parking brake can be deployed when the engine of the vehicle is either running or stopped. The parking brake remains deployed even when the vehicle is not generating any air pressure.

A parking brake system often includes a manually operated valve that is manipulated by the operator of the vehicle. A push-pull valve is one common type of parking brake valve. The parking brake valve is typically mounted on a dashboard or other operator panel of the vehicle.

It is possible for a parking brake valve to be accidentally or unintentionally deployed. For example, the operator could bump the parking brake while entering, exiting, or otherwise moving around in a cabin of the vehicle. In addition, a passenger can manipulate the parking brake valve when the operator is not ready for it to be released.

A prior art approach has been to provide an interlock that prevents release of the parking brake unless the operator steps on and deploys a service brake of the vehicle. As a consequence, the vehicle will not move when the parking brake is released.

In the prior art, an interlock valve is connected to the service brake system. The prior art interlock relays air from the service brake system to the parking brake system and is located upstream of the parking brake valve. Consequently, unless the service brake is deployed, the prior art parking brake system does not receive any air.

SUMMARY OF THE INVENTION

A parking brake interlock is provided according to the invention. The parking brake interlock comprises a parking brake inlet configured to receive a parking brake air supply, a service brake inlet configured to receive a service brake air supply, an exhaust port, and an interlock valve mechanism in communication with the parking brake inlet, the service brake inlet, and the exhaust port. The interlock valve mechanism is configured to exhaust the parking brake air supply if the service brake air pressure is not received. The interlock valve mechanism is further configured to hold the parking brake air supply in order to generate a parking brake air pressure if the service brake air pressure is received.

A parking brake interlock is provided according to the invention. The parking brake interlock comprises a parking brake inlet configured to receive a parking brake air supply, a service brake inlet configured to receive a service brake air supply, an exhaust port, and an ignition interlock mechanism. The ignition interlock mechanism is configured to move between a normally closed (NC), non-actuated position in an absence of an ignition-on signal and an open, actuated position in a presence of the ignition-on signal. The parking brake interlock further comprises an interlock valve mechanism interacting with the ignition interlock mechanism and in communication with the parking brake inlet, the service brake inlet, and the exhaust port. The interlock valve mechanism is configured to exhaust the parking brake air supply if the service brake air pressure is not received or if the ignition interlock mechanism is in the NC, non-actuated position. The interlock valve mechanism is further configured to hold the parking brake air supply in order to generate a parking brake air pressure if the service brake air pressure is received and if the ignition interlock mechanism is in the open, actuated position.

A parking brake interlock method is provided according to the invention. The method comprises receiving a parking brake air supply in a parking brake interlock from a parking brake valve and exhausting the parking brake air supply if a service brake air pressure is not received in the parking brake interlock from a service brake system. The method further comprises holding the parking brake air supply in order to generate a parking brake air pressure if the service brake air pressure is received in the parking brake interlock from the service brake system.

A parking brake interlock method is provided according to the invention. The method comprises receiving a parking brake air supply in a parking brake interlock from a parking brake valve and exhausting the parking brake air supply if a service brake air pressure is not received from a service brake system or if an ignition-on signal is absent at the parking brake interlock. The method further comprises holding the parking brake air supply in order to generate a parking brake air pressure if the service brake air pressure is received and if the ignition-on signal is received.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
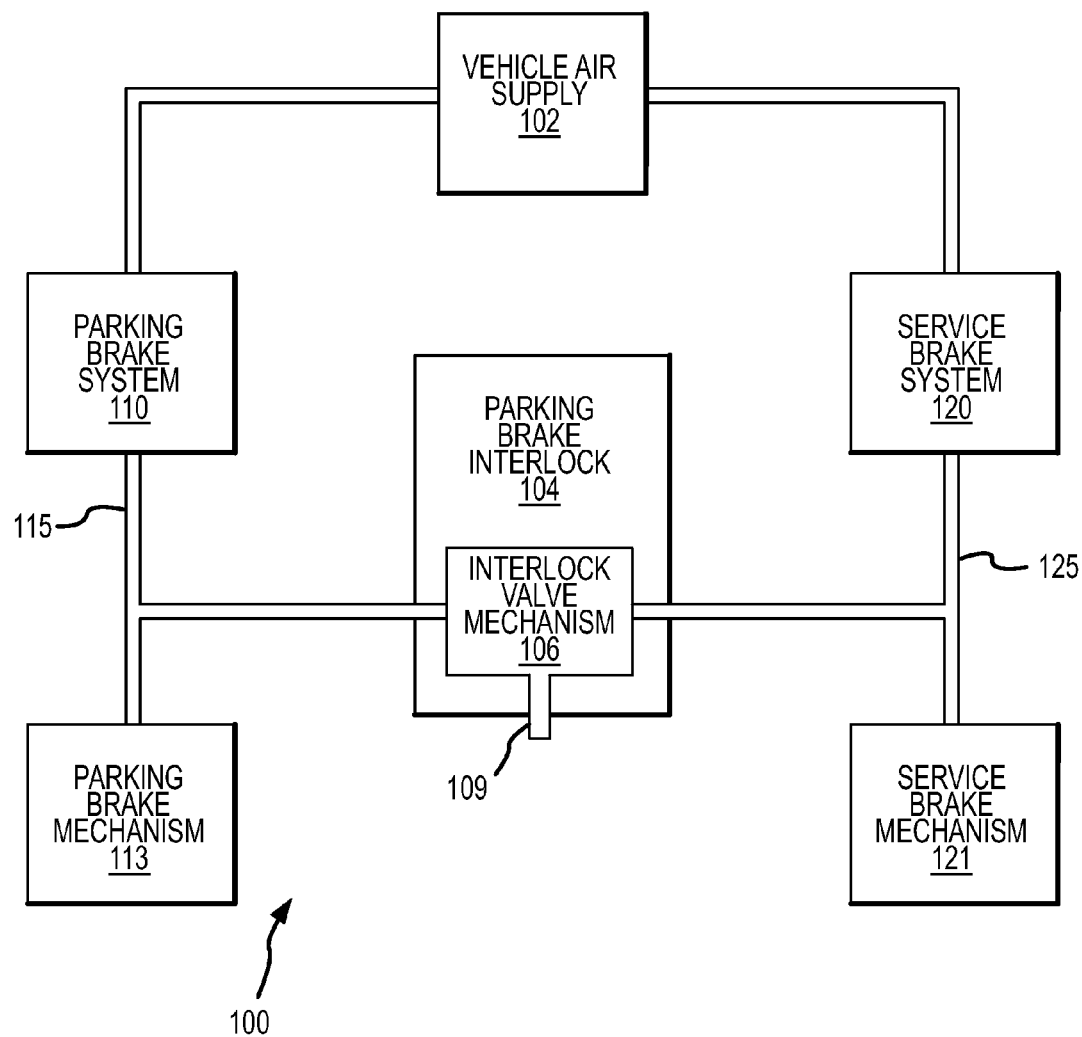
FIG. 1 shows a pneumatic brake system according to an embodiment of the invention.

FIG. 1 shows a pneumatic brake system 100 according to an embodiment of the invention. The pneumatic brake system 100 can comprise a brake system for a vehicle, including a wheeled vehicle, for example. In some embodiments, the pneumatic brake system 100 comprises a brake system for a truck or similar heavy vehicle. However, it should be understood that the pneumatic brake system 100 can be employed on any manner or size of vehicle.

The pneumatic brake system 100 includes a vehicle air supply 102, a service brake system 120 coupled to the vehicle air supply 102, and a service brake mechanism 121 coupled to the service brake system 120. The pneumatic brake system 100 further comprises a parking brake system 110 coupled to the vehicle air supply 102 and a parking brake mechanism 113 coupled to the parking brake system 110.

The service brake mechanism 121 can comprise one or more brake mechanisms for one or more corresponding wheels or rotating portions of the vehicle. In addition, the service brake mechanism 121 can comprise brake mechanisms on other vehicles coupled to the vehicle, such as a trailer or other coupled cars, for example.

The service brake system 120 regulates the provision of air to the service brake mechanism 121. The service brake mechanism 121 typically includes a brake mechanism that is actuated by a service brake air pressure. When the service brake air pressure is provided, the service brake mechanism 121 is actuated and a corresponding service brake mechanism is deployed and performs braking. In some embodiments, the service brake system 120 includes a foot treadle valve (not shown) that allows or blocks passage of air to the service brake mechanism, allowing a vehicle operator to apply and release the service brake mechanism 121.

The parking brake system 110 regulates the provision of air to the parking brake mechanism 113. The parking brake system 110 includes some manner of valve. For example, the parking brake system 110 in some embodiments can include a hand-operated valve, such as a push-pull valve for example, that can be mounted on a vehicle dashboard or other operator panel. The parking brake valve allows or blocks passage of air to the parking brake mechanism 113. A vehicle operator can push in and pull out the parking brake valve in order to engage and release the parking brake mechanism 113.

The parking brake mechanism 113 can comprise one or more brake mechanisms for one or more corresponding wheels or rotating portions of the vehicle. In addition, the parking brake mechanism 113 can comprise brake mechanisms on other vehicles coupled to the vehicle, such as a trailer or other coupled cars, for example.

The parking brake mechanism 113 typically includes a spring-loaded brake mechanism that is held in a non-deployed, non-braking position by air pressure. When the air pressure is exhausted or vented, the parking brake mechanism 113 is released and the spring-loaded brake mechanism is deployed and performs braking.

The parking brake mechanism 113 is coupled to the parking brake system 110 by a parking brake conduit 115. The service brake mechanism 121 is coupled to the service brake system 120 by a service brake conduit 125. The parking brake interlock 104 includes an interlock valve 106 that is coupled to both the parking brake conduit 115 and the service brake conduit 125. The interlock valve 106 further includes an exhaust vent 109 that can vent air supplied to the interlock valve 106 by the parking brake conduit 115.

In operation, the parking brake interlock 104 receives a service brake air supply from the service brake system 120 and receives a parking brake air supply from the parking brake system 110. Both the service brake air supply and the parking brake air supply may originate from the vehicle air supply 102. Further, the parking brake interlock 104 can receive the parking brake air supply from a parking brake valve of the parking brake system 110 when the parking brake is actuated and can receive the service brake air supply from a foot treadle valve of the service brake system 120 when the foot treadle valve is actuated.

The interlock valve 106 is configured to exhaust the parking brake air supply if the service brake air pressure is not received. The interlock valve 106 is further configured to hold the parking brake air supply in order to generate a parking brake air pressure if the service brake air pressure is received. The service brake air supply operates to close the exhaust vent 109 of the interlock valve 106. As a consequence, when the service brake system is actuated, such as by depression of a foot treadle valve, the exhaust vent 109 is blocked and the parking brake air supply is not vented from the parking brake interlock 104. Holding the parking brake air supply provides the parking brake air supply to the parking brake mechanism 113, releasing the parking brake. Once the parking brake air pressure has built up and the parking brake has been released, the interlock valve mechanism 106 latches (see FIG. 5 and the accompanying discussion).

As a consequence of the arrangement, air is supplied to the interlock 104 even when the service brake is not in use. In addition, the operator can move the parking brake valve to a release position before depressing the service brake.

One aspect of this arrangement is that if the service brake valve is not actuated and the operator tries to release the parking brake, then the parking brake air supply will be continuously vented from the interlock until the service brake is applied. This can generate an audible air loss sound as a reminder to the operator that the service brake should be applied.

Another aspect of this arrangement is that the parking brake is not released in the event of failure of the parking brake interlock 104.

Yet another aspect of this arrangement is that the parking brake interlock of this embodiment is purely pneumatic.

Figure 2:
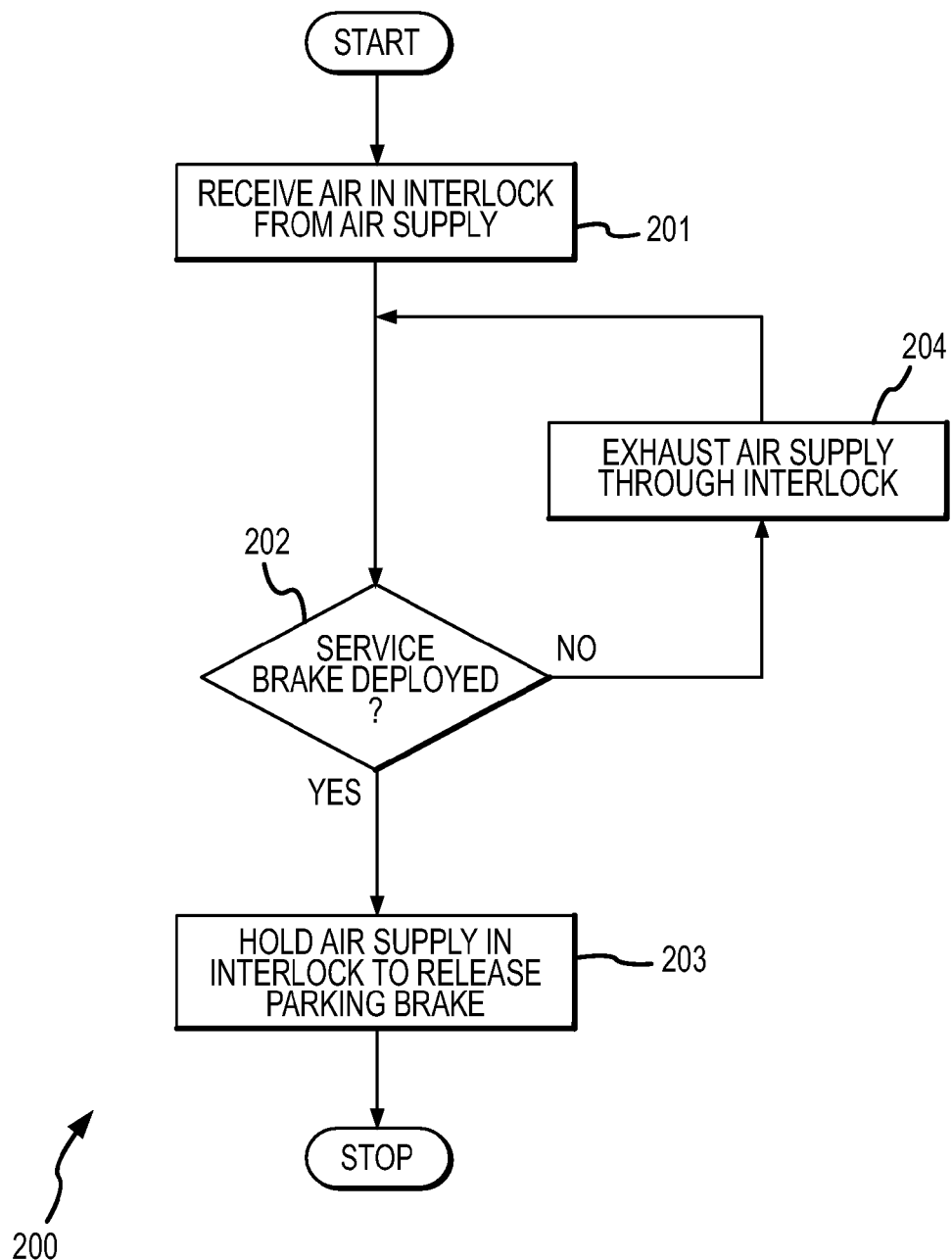
FIG. 2 is a flowchart of a parking brake interlock method according to an embodiment of the invention.

FIG. 2 is a flowchart 200 of a parking brake interlock method according to an embodiment of the invention. In step 201, a parking brake air supply is received in a parking brake interlock. The parking brake air supply can be received as a consequence of an operator opening a parking brake valve, for example. The parking brake air supply can therefore comprise air received from a vehicle air supply through a parking brake valve.

In step 202, if a service brake is deployed, the method branches to step 203. Otherwise, if the service brake is not deployed, then the method branches to step 204.

In step 203, because the service brake is deployed, the parking brake air supply from the parking brake system is held in the parking brake interlock and is not vented. This assumes that the parking brake air supply has been received from the parking brake system. If the parking brake air supply has been received, then it is held and the parking brake is consequently released by the parking brake air supply building up to create a parking brake air pressure.

In step 204, because the service brake is not deployed, the parking brake air supply is vented from the parking brake interlock. A parking brake air pressure is not built up. Consequently, the parking brake mechanism 113 cannot be released. However, it should be understood that if the parking brake valve has not been opened, then the parking brake air supply will not be received in the interlock and will not be vented by the interlock.

Figure 3:
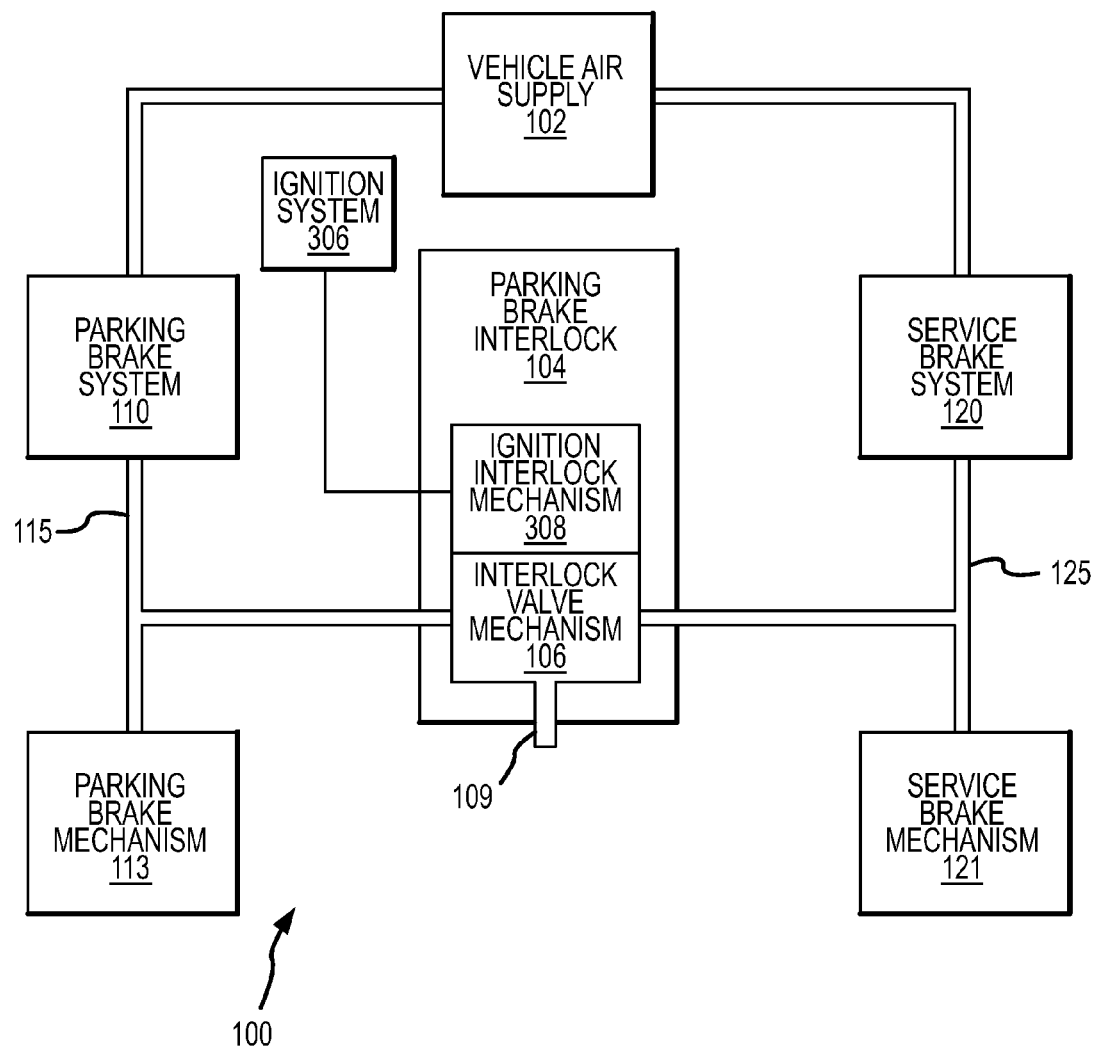
FIG. 3 shows the pneumatic brake system according to an embodiment of the invention.

FIG. 3 shows the pneumatic brake system 100 according to an embodiment of the invention. The pneumatic brake system 100 includes all of the components of FIG. 1 plus an ignition system 306 coupled to an ignition interlock mechanism 308.

The ignition system 306 generates an ignition-on signal corresponding to an ignition state of the vehicle. Because it may be desired to not allow the parking brake to be released when in an ignition-off state, the ignition-on signal in this embodiment is incorporated into the parking brake interlock 104.

The ignition-on signal includes an engine running state and/or an ignition key turned to an on state, for example. Other ignition-on states are contemplated and are within the scope of the description and claims.

The ignition interlock mechanism 308 receives the ignition-on signal from the ignition system 306. If the vehicle is running or if a vehicle key is in an on position, then an ignition-on signal will be received. Conversely, if the vehicle is not running or a vehicle key is not in the on position, then an ignition-on signal will not be received.

The ignition interlock mechanism 308 in one embodiment comprises a solenoid valve including an electrically energizable coil and an armature (see FIG. 8) that moves substantially into and substantially out of the coil when the coil is energized and de-energized. In one embodiment, the ignition interlock mechanism 308 further includes a valve mechanism that is actuated by the armature. However, it should be understood that the ignition interlock mechanism 308 can employ other mechanisms for blocking and unblocking the parking brake interlock 104.

When the ignition-on signal is not received, the ignition interlock mechanism 308 defaults to a normally closed (NC), non-actuated position, blocking the supply of air from the service brake air supply to the interlock valve mechanism 106. Conversely, when the ignition-on signal is received, the ignition interlock mechanism 308 is actuated and the service brake air supply is allowed into the interlock valve mechanism 106. Therefore, the parking brake interlock 104 of this embodiment is configured to exhaust a parking brake air supply received from a parking brake system if a service brake air pressure is not received from a service brake system or if an ignition-on signal is absent at the parking brake interlock. Conversely, the parking brake interlock 104 is configured to hold the parking brake air supply in order to generate a parking brake air pressure if the service brake air pressure is received from the service brake system and if the ignition-on signal is received in the parking brake interlock 104.

In the open, actuated position, the ignition interlock mechanism 308 will allow the service brake air supply to move the interlock valve mechanism 106. As a result, the interlock valve mechanism 106 can be moved by the service brake air supply and stop the venting of the parking brake air supply. Note, however, that the ignition-on signal only enables the service brake actuation to provide air to the parking brake mechanism 113. The ignition-on signal will not by itself block the venting of the parking brake air supply without the service brake deployment.

In the NC, non-actuated position, the ignition interlock mechanism 308 will not allow the service brake air supply to move the interlock valve mechanism 106. As a result, the interlock valve mechanism 106 will continue to vent the parking brake air supply.

Figure 4:
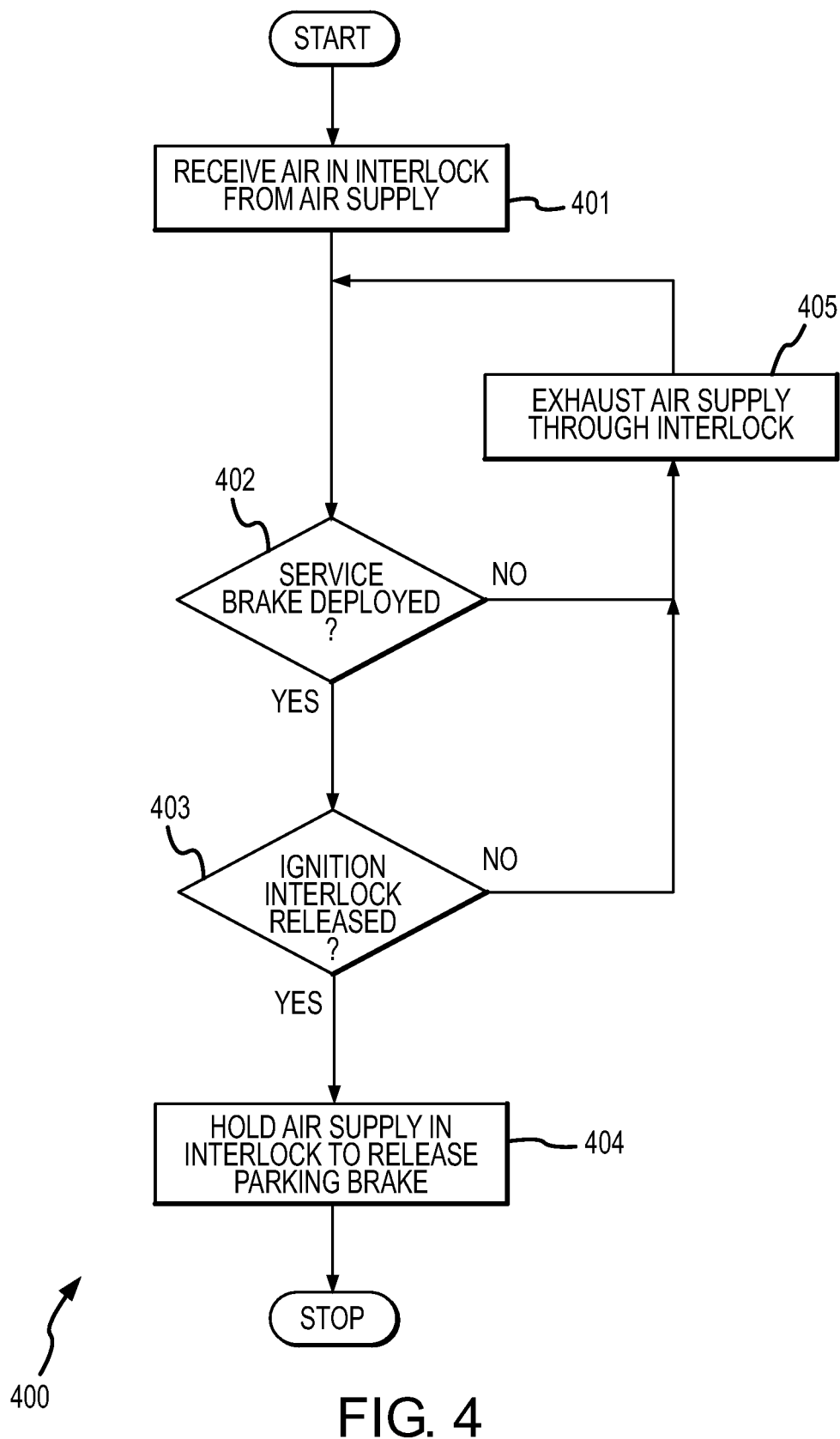
FIG. 4 is a flowchart of a parking brake interlock method according to an embodiment of the invention.

FIG. 4 is a flowchart 400 of a parking brake interlock method according to an embodiment of the invention. In step 401, a parking brake air supply is received in a parking brake interlock, as previously discussed.

In step 402, if a service brake is deployed, the method proceeds to step 403. Otherwise, if the service brake is not deployed, then the method branches to step 405.

In step 403, if an ignition interlock is released, then the method proceeds to step 404. The ignition interlock can be released by reception of an ignition-on signal, for example. Otherwise, if the ignition interlock has not been released, then the method branches to step 405.

In step 404, because the service brake is deployed and the ignition interlock is released, the parking brake air supply from the parking brake system is held in the parking brake interlock and is not vented. This assumes that the parking brake air supply has been received from the parking brake system. If the parking brake air supply has been received, then it is held and the parking brake is consequently released by the parking brake air supply building up to create a parking brake air pressure.

In step 405, because the service brake is not deployed, the ignition interlock is not released, or both conditions, the parking brake air supply is vented from the parking brake interlock. A parking brake air pressure is not built up. However, it should be understood that if the parking brake valve has not been opened, then the parking brake air supply will not be received in the interlock and will not be vented by the interlock.

Figure 5:
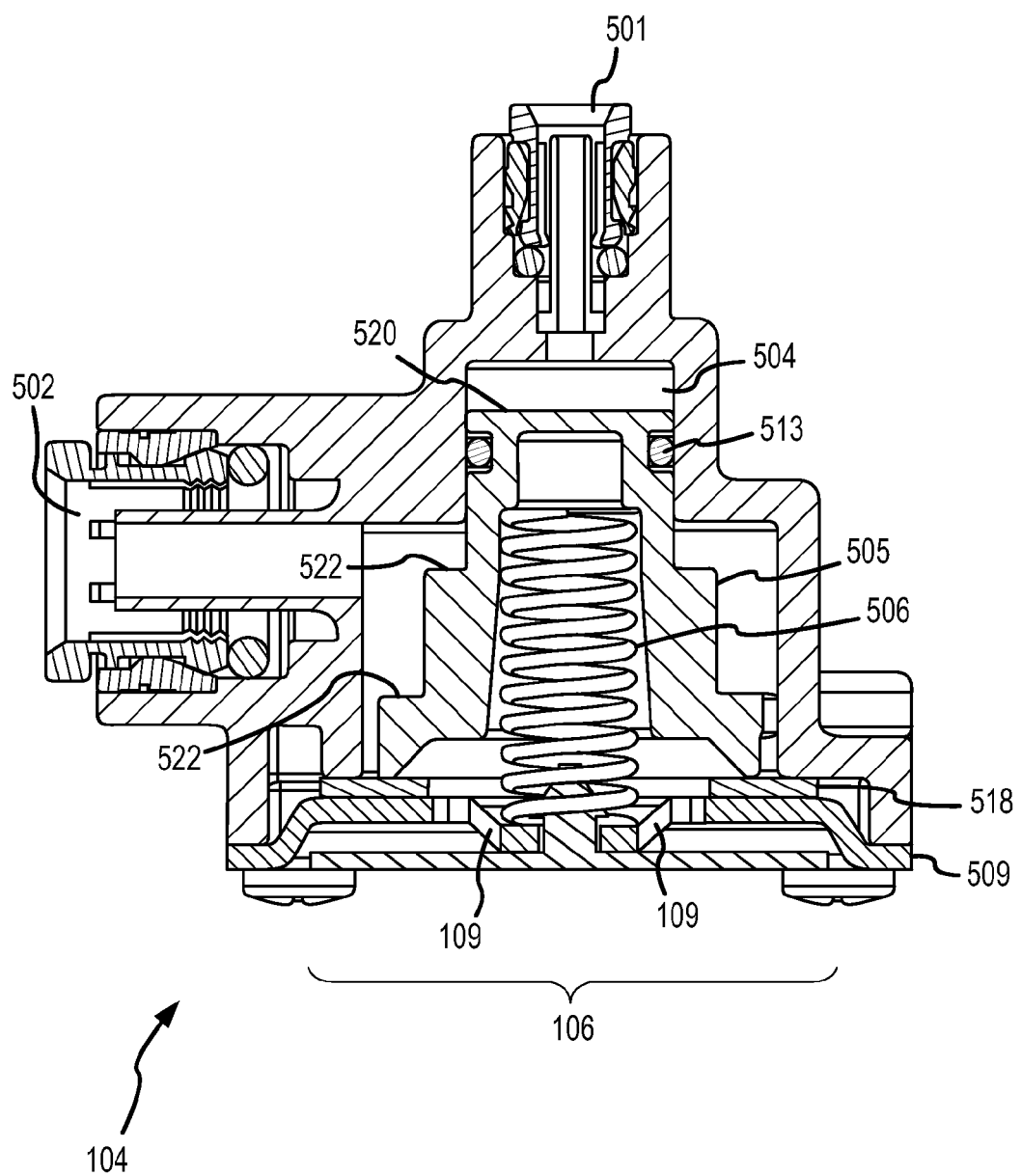
FIG. 5 is a section view of the parking brake interlock according to an embodiment of the invention.

FIG. 5 is a section view of the parking brake interlock 104 according to an embodiment of the invention. The parking brake interlock 104 includes a service brake air inlet 501, a parking brake air inlet 502, and a bore 504 connecting the service brake air inlet 501 to the parking brake air inlet 502. A single service brake conduit and a single parking brake conduit can therefore be connected to the parking brake interlock 104.

In the bore 504 is a plunger 505. The plunger 505 is configured to move in the bore 504. One or more seals 513 seal the plunger 505 to at least a portion of the bore 504. A plug 509 retains the plunger 505 within the bore 504 and a biasing device 506 urges the plunger 505 away from the plug 509. One or more plug seals 518 seal the plug 509 to the body of the parking brake interlock 104. In addition, the one or more plug seals 518 can sealingly engage the plunger 505 in order to prevent loss of air through the vent passage 109.

The plug 509 is contacted by the plunger 505 when the service brake air supply at the service brake air inlet 501 is above a predetermined pressure. In this case, the air pressure overcomes a biasing force provided by the biasing device 506. Alternatively, when there is not sufficient service brake air pressure, the biasing device 506 will lift the plunger 505 away from the one or more plug seals 518, venting parking brake air supplied by the parking brake air inlet 502 when the parking brake air supply is provided.

The section view shows the parking brake interlock 104 when the service brake air supply and the parking brake air supply are both provided. As a result, the service brake air supply pushes the plunger 505 downward in the figure, against the biasing device 506, and holds the exhaust vent 109 closed, building up the parking brake air pressure. As a result, the parking brake is released by the parking brake air pressure.

The interlock valve mechanism 106 holds the parking brake air supply upon initial provision of the parking brake air supply and the service brake air supply. Therefore, once the parking brake air pressure has built up and the parking brake has been released, the interlock valve mechanism 106 latches in the closed position. The service brake air pressure can subsequently be released/removed without the interlock valve mechanism 106 reverting back into an air exhausting mode. This is made possible by an exhaust seal pressure area 522 being larger than a service brake pressure area 520 of the plunger 505. Consequently, the plunger 505 is pressure-loaded toward a closed position when the parking brake air supply/pressure is present.

The plunger 505 returns to its de-actuated, air exhausting position (the upward position in the figure) only when the parking brake air pressure is cut off by the operator or by the loss of parking brake air pressure for any reason. The operator cuts off the parking brake air pressure by closing the parking brake valve and therefore applying the parking brake, shutting off the parking brake air supply.

Figure 6:
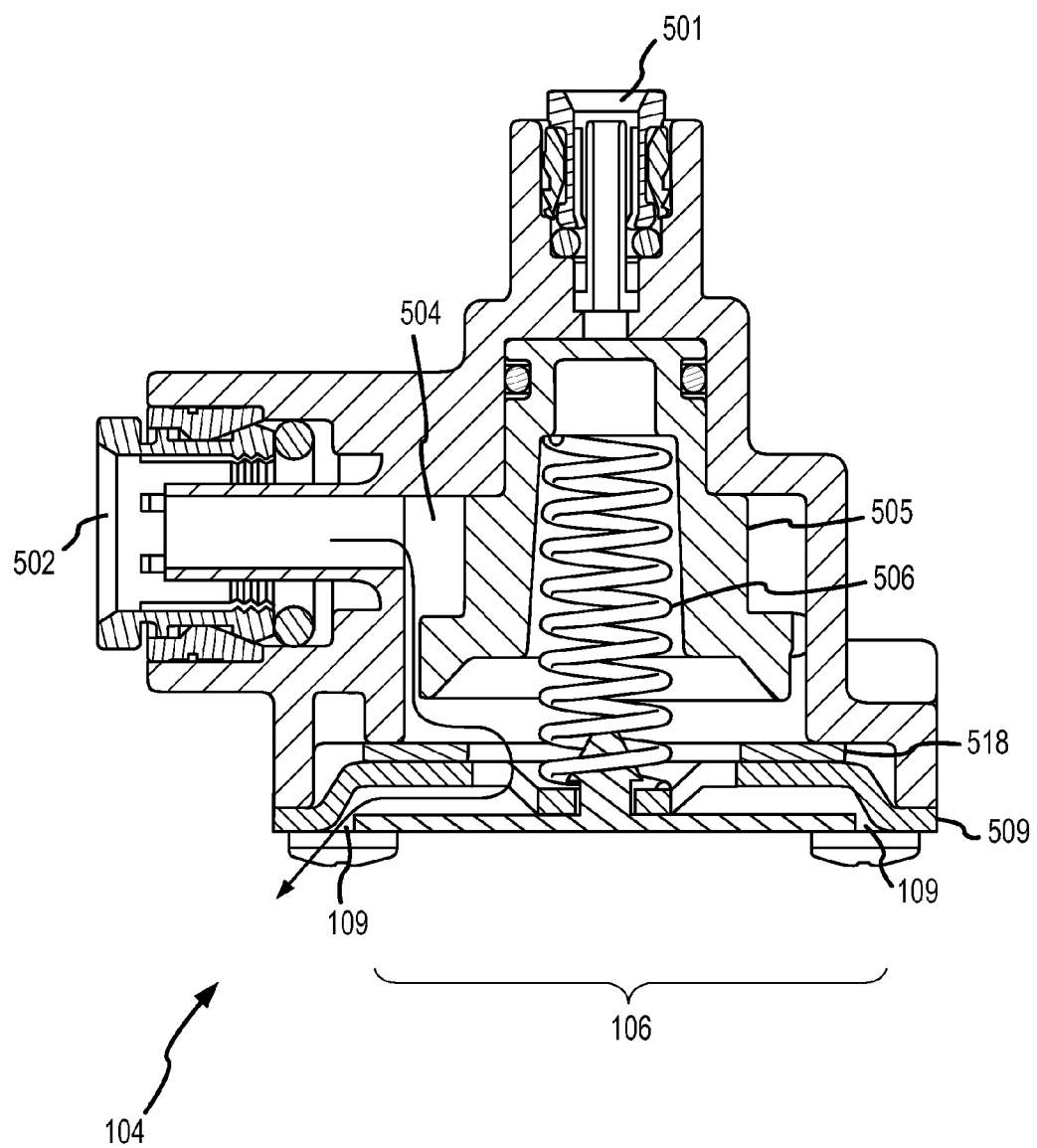
FIG. 6 is a section view of the parking brake interlock where there is insufficient service brake air pressure.

FIG. 6 is a section view of the parking brake interlock 104 where there is insufficient service brake air pressure. As a result, the plunger 505 moves upward in the figure due to the biasing device 506, the exhaust vent 109 opens, and the parking brake interlock 104 exhausts the parking brake air supply. Consequently, the parking brake cannot be released.

Figure 7:
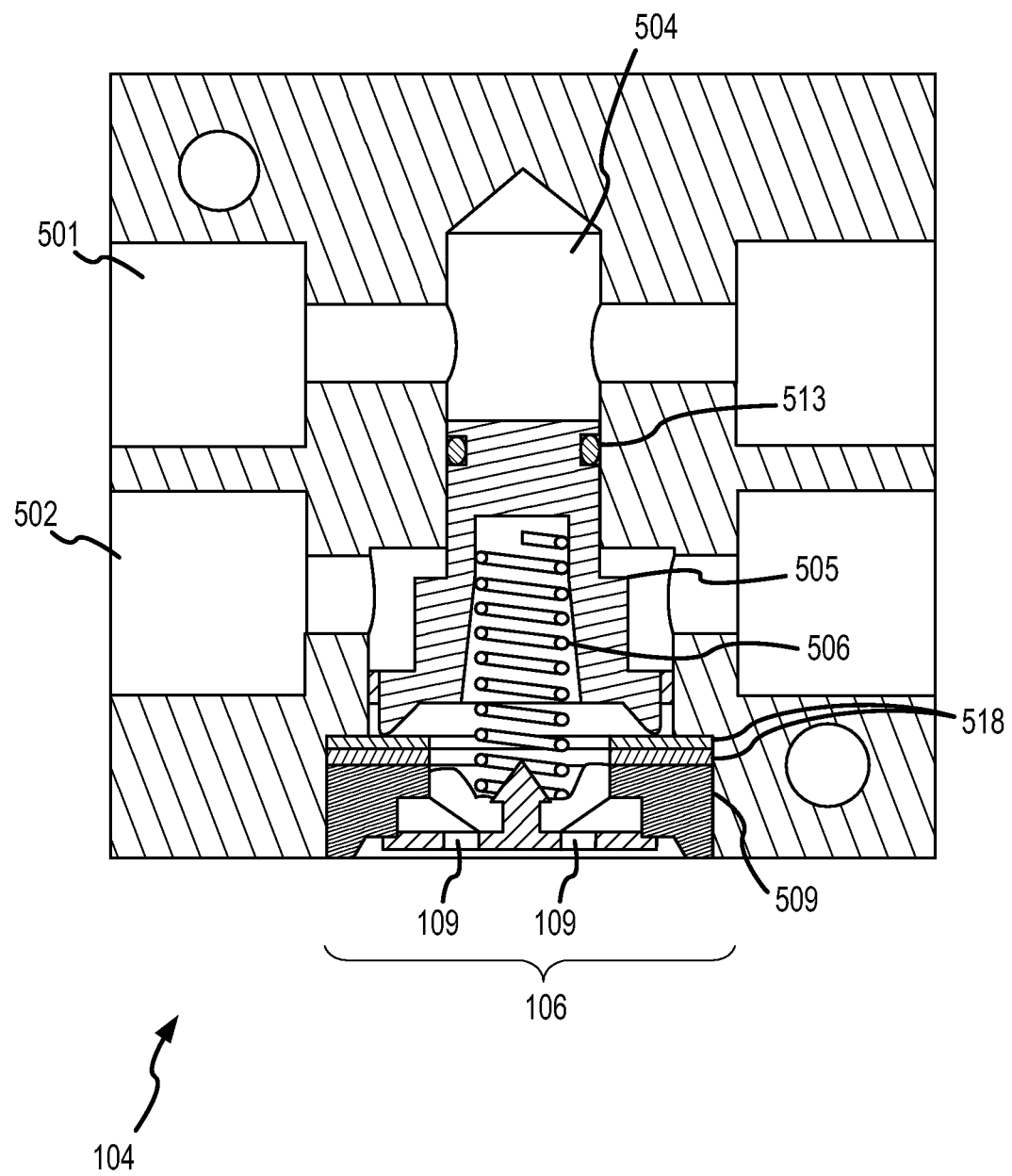
FIG. 7 is a section view of the parking brake interlock that can receive two service brake conduits and two parking brake conduits.

FIG. 7 is a section view of the parking brake interlock 104 that can receive two service brake conduits and two parking brake conduits. As a result, the parking brake interlock 104 of this embodiment can be connected substantially in-line.

Figure 8:
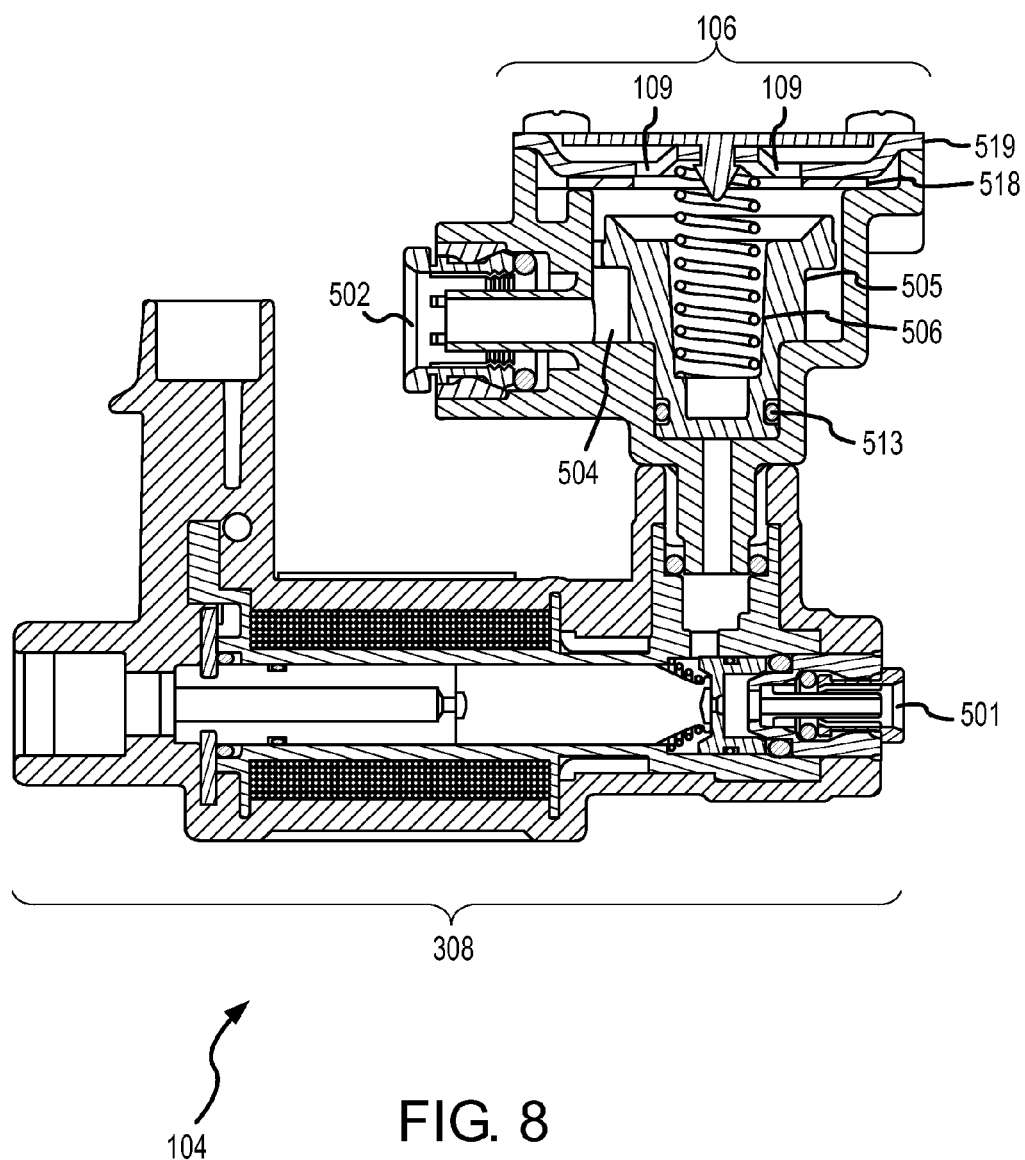
FIG. 8 is a section view of the parking brake interlock that includes an ignition interlock mechanism.

FIG. 8 is a section view of the parking brake interlock 104 that includes an ignition interlock mechanism 308. As previously discussed, the ignition interlock mechanism 308 can include a solenoid valve mechanism, for example, that can move between a NC, non-actuated position and an open, actuated position. When the ignition interlock mechanism 308 is actuated, such as by receiving an ignition-on signal, the ignition interlock mechanism 308 is actuated to an open position, allowing the service brake air supply into the interlock valve mechanism 106. In the absence of the ignition-on signal, the ignition interlock mechanism 308 will default to the NC, non-actuated position, preventing the service brake air supply from being provided into the interlock valve mechanism. 106.

In some embodiments the ignition interlock mechanism 308 can comprise a three-way solenoid valve. Consequently, the service brake air supply at the service brake air inlet 501 is vented through the ignition interlock mechanism 308 when the ignition interlock mechanism 308 is in the NC, non-actuated position. This guarantees that even if the shut-off seal of the ignition interlock mechanism 308 should leak, a required actuation pressure cannot be achieved in the bore 504 and on the plunger 505.

What is claimed is:

1. A parking brake interlock, comprising:
   a parking brake inlet configured to receive a parking brake air supply;
   a service brake inlet configured to receive a service brake air supply;
   an exhaust port; and
   an interlock valve mechanism in communication with the parking brake inlet, the service brake inlet, and the exhaust port, with the interlock valve mechanism being moved to an actuated position by provision of service brake air pressure from the service brake air supply, wherein the interlock valve mechanism blocks the exhaust port in the actuated position, and with the interlock value mechanism moving to a non-actuated position in an absence of the service brake air pressure, wherein the parking brake inlet is in communication with the exhaust port in the non-actuated position, and with the interlock valve mechanism being configured to continuously exhaust the parking brake air supply from the parking brake interlock if the service brake air supply is not received and being further configured to hold the parking brake air supply in order to generate a parking brake air pressure if the service brake air supply is received.

2. The interlock of claim 1, with the parking brake; supply being received from a parking brake system.

3. The interlock of claim 1, with the service brake air supply being received from a service brake system.

4. The interlock of claim 1, further comprising an ignition interlock mechanism configured to move between a normally closed (NC), non-actuated position in an absence of an ignition-on signal and an open, actuated position in a presence of the ignition-on signal and with the interlock valve mechanism being configured to continuously exhaust the parking brake air supply from the parking brake interlock if the service brake air supply is not received or if the ignition interlock mechanism is in the NC, non-actuated position and being further configured to hold the parking brake air supply in order to generate the parking brake air pressure if the service brake air supply is received and if the ignition interlock mechanism is in the open, actuated position.

5. The interlock of claim 1, with the interlock valve mechanism being further configured to latch in a closed position and hold the parking brake air supply upon initial provision of the service brake air supply and to automatically revert back to an exhausting mode if the parking brake supply is lost.

6. A parking brake interlock, comprising:
   a parking brake inlet configured to receive a parking brake air supply;
   a service brake inlet configured to receive a service brake air supply;
   an exhaust port;
   an ignition interlock mechanism configured to move between a normally closed (NC), non-actuated position in an absence of an ignition-on signal and an open, actuated position in a presence of the ignition-on signal; and
   an interlock valve mechanism interacting with the ignition interlock mechanism and in communication with the parking brake inlet, the service brake inlet, and the exhaust port, with the interlock valve mechanism being moved to an actuated position by provision of service brake air pressure from the service brake air supply, wherein the interlock valve mechanism blocks the exhaust port in the actuated position, and with the interlock valve mechanism moving to a non-actuated position in an absence of the service brake air pressure, wherein the parking brake inlet is in communication with the exhaust port in the non-actuated position, and with the interlock valve mechanism being configured to continuously exhaust the parking brake air supply from the parking brake interlock if the service brake air supply is not received or if the ignition interlock mechanism is in the NC, non-actuated position and being further configured to hold the parking brake air supply in order to generate a parking brake air pressure if the service brake air supply is received and if the ignition interlock mechanism is in the open, actuated position.

7. The interlock of claim 6, with the parking brake air supply being received from a parking brake system.

8. The interlock of claim 6, with the service brake air supply being received from a service brake system.

9. The interlock of claim 6, with the interlock valve mechanism being further configured to latch in a closed position and hold the parking brake air supply upon initial provision of the service brake air supply and to automatically revert back to an exhausting mode if the parking brake supply is lost.

10. A parking brake interlock method, comprising:
    receiving a parking brake air supply in a parking brake interlock from a parking brake valve, with the interlock valve mechanism being moved to an actuated position by provision of service brake air pressure from the service brake air supply, wherein the interlock valve mechanism blocks the exhaust port in the actuated position, and with the interlock valve mechanism moving to a non-actuated position in an absence of the service brake air pressure, wherein the parking brake inlet is in communication with the exhaust port in the non-actuated position;
    continuously exhausting the parking brake air supply from the parking brake interlock if a service brake air supply is not received in the parking brake interlock from a service brake system; and
    holding the parking brake air supply in order to generate a parking brake air pressure if the service brake air supply is received in the parking brake interlock from the service brake system.

11. The method of claim 10, with the continuously exhausting comprising continuously exhausting the parking brake air supply from an exhaust vent of the parking brake interlock.

12. The method of claim 10, wherein the exhausting will continue until the service brake air supply is received or the parking brake air supply ceases to be received.

13. The method of claim 10, further comprising an ignition interlock mechanism configured to move between a normally closed (NC), non-actuated position in an absence of an ignition-on signal and an open, actuated position in a presence of the ignition-on signal and with the interlock valve mechanism being configured to continuously exhaust the parking brake air supply from the parking brake interlock if the service brake air supply is not received or if the ignition interlock mechanism is in the NC, non-actuated position and being further configured to hold the parking brake air supply in order to generate the parking brake air pressure if the service brake air supply is received and if the ignition interlock mechanism is in the open, actuated position.

14. The method of claim 10, further comprising the parking brake interlock latching in a closed position and holding the parking brake air supply upon initial provision of the service brake air supply.

15. A parking brake interlock method, comprising:
    receiving a parking brake air supply in a parking brake interlock from a parking brake valve, with the interlock valve mechanism being moved to an actuated position by provision of service brake air pressure from the service brake air supply, wherein the interlock valve mechanism blocks the exhaust port in the actuated position, and with the interlock valve mechanism moving to a non-actuated position in an absence of the service brake air pressure, wherein the parking brake inlet is in communication with the exhaust port in the non-actuated position;
    continuously exhausting the parking brake air supply from the parking brake interlock if a service brake air supply is not received from a service brake system or if an ignition-on signal is absent at the parking brake interlock; and
    holding the parking brake air supply in order to generate a parking brake air pressure if the service brake air supply is received and if the ignition-on signal is received.

16. The method of claim 15, with the continuously exhausting comprising continuously exhausting the parking brake air supply from an exhaust vent of the parking brake interlock.

17. The method of claim 15, wherein the continuously exhausting will continue until the service brake air supply is received or the parking brake air supply ceases to be received.

18. The method of claim 15, further comprising the parking brake interlock latching in a closed position and holding the parking brake air supply upon initial provision of the service brake air supply.

* * * * *